(12) United States Patent
Humes

(10) Patent No.: US 6,796,575 B2
(45) Date of Patent: Sep. 28, 2004

(54) HITCH ASSEMBLY FOR ATTACHING A TRAILER TO A BICYCLE

(75) Inventor: Daniel M. Humes, Trinidad, CA (US)

(73) Assignee: Watermark PaddleSports, Inc., Arcata, CA (US)

( * ) Notice: Subject to any disclaimer, the term of this patent is extended or adjusted under 35 U.S.C. 154(b) by 0 days.

(21) Appl. No.: 09/903,827

(22) Filed: Jul. 11, 2001

(65) Prior Publication Data

US 2003/0011170 A1 Jan. 16, 2003

(51) Int. Cl.[7] .................................................. B60D 1/48
(52) U.S. Cl. ...................................... 280/503; 280/504
(58) Field of Search ................................ 280/504, 204, 280/239, 492–495, 503

(56) References Cited

U.S. PATENT DOCUMENTS

| | | | | |
|---|---|---|---|---|
| 2,517,162 A | * | 8/1950 | Arman | 180/15 |
| 4,114,919 A | * | 9/1978 | Stowe | 280/292 |
| 4,261,592 A | * | 4/1981 | Busseuil | 280/292 |
| 4,342,467 A | * | 8/1982 | Kester | 280/204 |
| 4,756,541 A | * | 7/1988 | Albitre | 280/204 |
| 5,037,019 A | | 8/1991 | Sokn | |
| 5,039,120 A | * | 8/1991 | Stowe | 280/204 |
| 5,067,738 A | * | 11/1991 | O'Connor | 280/204 |
| 5,076,600 A | * | 12/1991 | Fake | 280/204 |
| 5,240,266 A | * | 8/1993 | Kelley et al. | 280/204 |
| 5,275,319 A | | 1/1994 | Ruana | |
| 5,470,088 A | * | 11/1995 | Adams | 280/204 |
| 5,598,959 A | | 2/1997 | Lorensen et al. | |
| 5,743,543 A | * | 4/1998 | Chiu | 280/231 |
| 5,749,592 A | * | 5/1998 | Marchetto | 280/292 |
| 5,785,335 A | | 7/1998 | George | |
| 5,842,710 A | * | 12/1998 | Couture | 280/204 |
| 6,471,230 B2 | * | 10/2002 | Ellsworth et al. | 280/284 |

* cited by examiner

Primary Examiner—Lesley D. Morris
Assistant Examiner—Paul Royal, Jr.
(74) Attorney, Agent, or Firm—Kolisch Hartwell, P.C.

(57) ABSTRACT

A hitch assembly for attaching a trailer to a bicycle includes a hitch unit mounted on a wheelstay assembly above the rear axle of a bicycle. The wheelstay assembly is pivotally connected at its lower ends to a skewer extending through the rear axle hub and a strut member is pivotally connected to the seat post of the bicycle and to the hitch unit. The hitch unit is rotatable about a substantially vertical first pivot axis and includes a mounting for attachment by a tongue of a trailer, such as a trailer cycle. The tongue is attached to the hitch unit so that it can swing about a substantially vertical first axis and pivot about a substantially horizontal second axis. When the hitch assembly is mounted on a suspension bicycle, it is able to move up and down, substantially vertically, as the rear wheel moves up and down relative to the frame and seat of the bicycle. That up-and-down movement of the hitch assembly provides a more comfortable ride and less vibration and shock is transmitted along the tongue to the trailed vehicle, such as a trailer cycle.

17 Claims, 4 Drawing Sheets

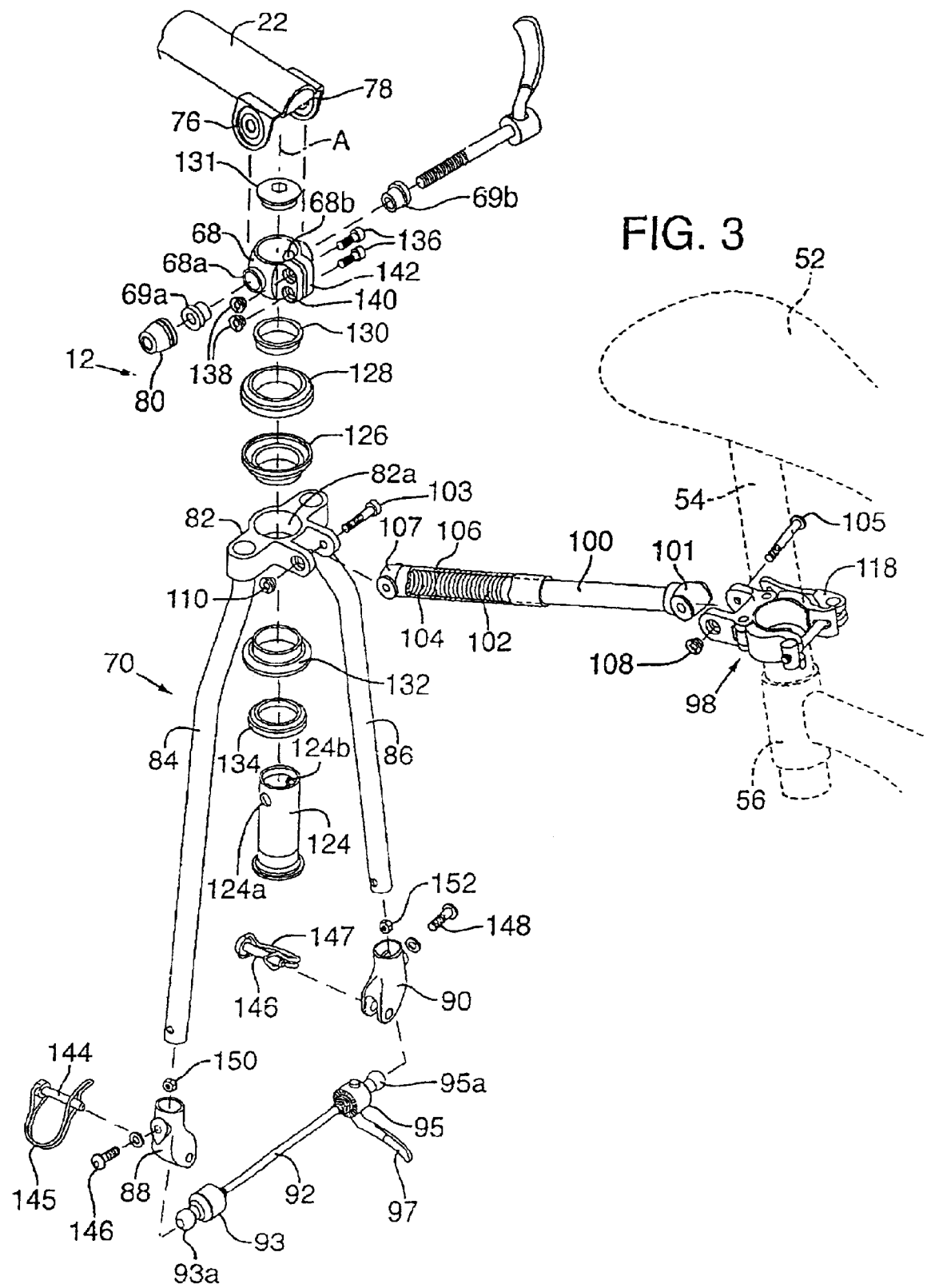

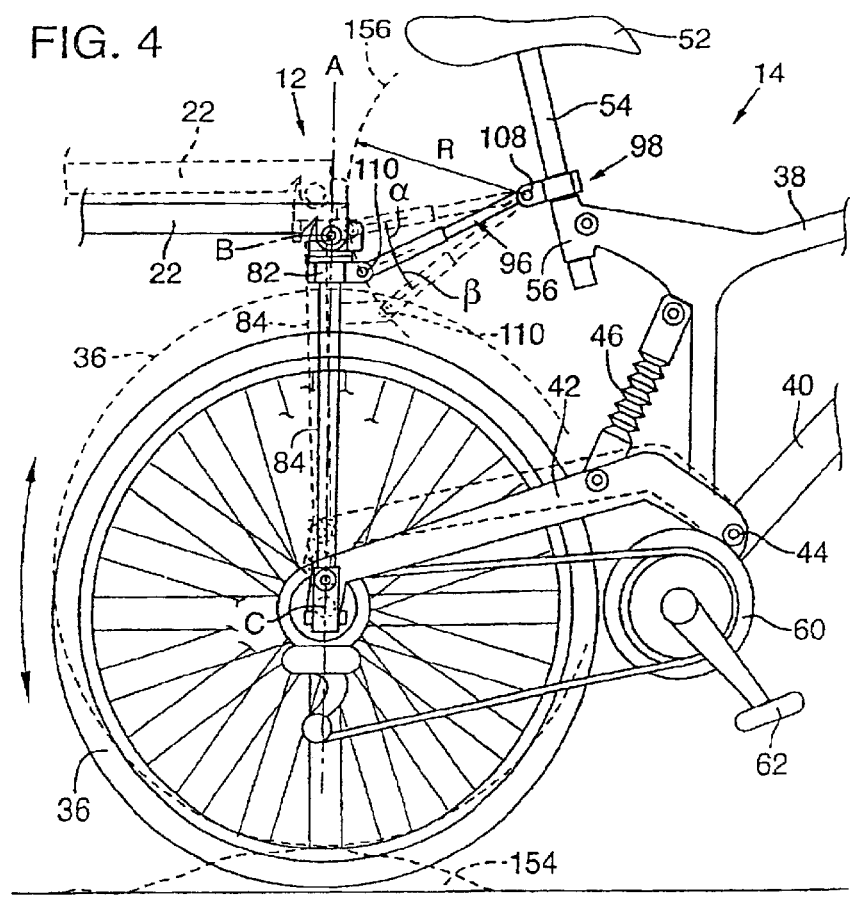
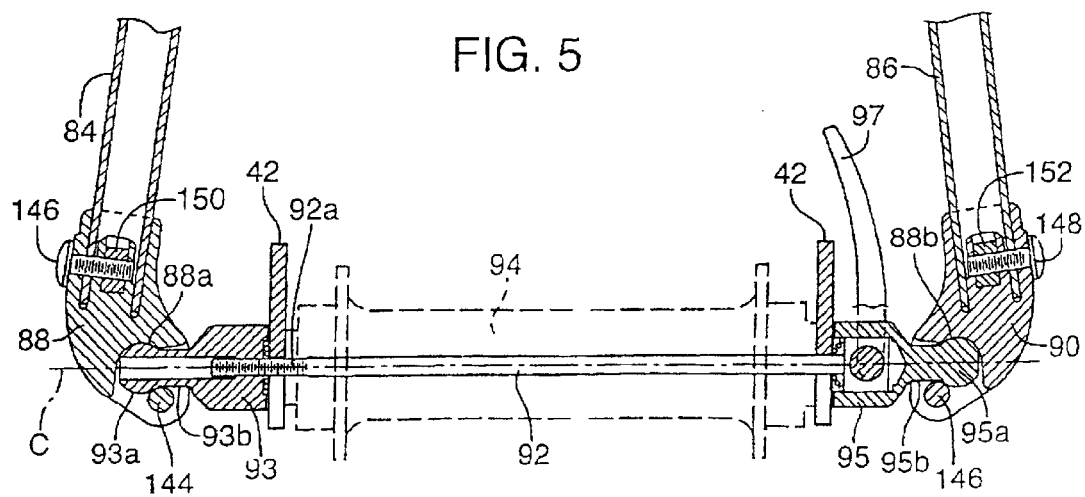

HITCH ASSEMBLY FOR ATTACHING A TRAILER TO A BICYCLE

FIELD OF THE INVENTION

The present invention relates to bicycles and bicycle accessories, and more particularly to bicycles adapted for connection to a trailer, such as a child or bike cargo trailer or trailer cycle. It has become increasingly popular to use bicycles to pull small trailers, either for transporting children, pets and/or cargo. These trailers often are positioned low to the ground and include some type of drawbar or tongue connected to the lead bicycle. A new type of trailer is the so-called "trailer cycle," a small, single-wheeled cycle, having a seat and handlebars, connected via a tongue to the lead bicycle. A trailer cycle typically is provided with a pedal/sprocket/chain assembly. An adult can now ride the lead bicycle and pull a child behind seated on the trailer cycle. The child can pedal away, steering and learning how to ride, while being safely pulled along.

An example of a trailer cycle is disclosed in U.S. Pat. No. 5,785,335 which discloses a vehicle having a frame, a main tube extending toward the lead cycle and a hitch mechanism located between the lead cycle and the trailer cycle. The hitch mechanism is positioned substantially vertically above the hub of the lead-cycle rear wheel, and is housed in an orthogonal member which has an adjustable vertical pivot mechanism and a similarly adjustable yaw pivot mechanism. The orthogonal member is mounted on a frame construction which is rigidly connected to the bicycle on a rack frame which includes diagonal braces and supports as well as seat-stay attachments for interconnecting the rack frame to the bicycle frame. Another type of trailer cycle includes a long tongue which is connected to the seat post of the leading or pulling bicycle.

SUMMARY OF THE INVENTION

The present invention is directed to a novel hitch assembly which is mounted to a bicycle adapted for connection to the tongue of a vehicle to be trailed behind, such as a trailer cycle, which enables the trailer cycle to closely follow the steering, leaning and handling of the lead bicycle by its rider. The hitch assembly of the present invention includes a hitch unit which is mounted directly above the rear wheel and hub/axle assembly of the lead bicycle, and to which the tongue is connected. The hitch unit is rotatable about a substantially vertical first pivot axis, and includes structure for enabling the tongue to be pivoted about a substantially horizontal second pivot axis. The hitch unit is mounted on a support structure above the rear hub/axle assembly of the lead bicycle, and is connected by an adjustable stabilizer or strut member to the seat post of the bicycle.

The hitch assembly of the present invention finds particular utility when mounted on "suspension" bicycles, which include a shock absorber or other structure enabling the rear wheel to move up and down relative to the seat, and substantially vertically, relative to the ground, as the bicycle encounters bumps and depressions in the road. Suspension vehicles take variant forms, but differ from conventional non-suspension bicycles by enabling relative movement of the rear wheel to the frame. Examples of suspension bicycles are those which include so-called four-bar-linkage systems, which enable the rear axle of the rear wheel, and correspondingly the rear wheel, to move relative to the seat of the bicycle, in a substantially vertical direction, providing a cushioned ride.

While the present invention has particular utility with respect to use on a suspension bicycle, because those bicycles permit up and down movement of the rear wheel relative to the frame, it can also be used on conventional bicycles without a rear-wheel suspension system. The hitch assembly enables the attached tongue of the trailer to swing about a first pivot axis, which is substantially vertical, and about a second pivot axis, which is substantially horizontal. This pivoting action enables the rider of an attached trailer cycle to feel the action of the lead bicycle, operated by an adult, as the lead bicycle negotiates turns, goes up and down hills and slopes, encounters and rides over bumps, swerves to avoid road obstacles, etc.

The hitch assembly of the present invention enables movement of the hitch unit, relative to the frame of the bicycle, by incorporation of a support structure, including vertically-mounted wheelstays, pivotally connected at their lower ends to opposite ends of a uniquely-configured skewer so that there is a pivotal connection at the hub assembly. A stabilizing member in the form of a lengthwise-adjustable strut member has a first end detachably and pivotally connected, by a releasable clamp, to the seat post of the bicycle, and a second end pivotally connected to an upper end of the wheelstay assembly adjacent the hitch unit. When this construction is used on a suspension bicycle, impact from bumps will displace the rear wheel upwardly, relative to the seat of the bicycle, and that will cause the wheelstay assembly to move upwardly also, but swing just slightly from the vertical because the hitch unit is pivotally connected to the strut member. As bumps and depressions are encountered, the wheelstays move up and down with the rear wheel.

BRIEF DESCRIPTION OF THE DRAWINGS

FIG. 3 is an exploded view of the components of the hitch assembly of the present invention;

FIG. 4 is a side view, enlarged from that of FIG. 1, showing the hitch assembly of the present invention as it moves up and down, with up-and-down action of the rear wheel of a suspension bicycle; and FIG. 5 is an enlarged view, in cross section, showing ends of the support structure of the hitch assembly of the present invention at its connections to opposite ends of a skewer extending through the rear hub of the bicycle.

DETAILED DESCRIPTION OF THE PREFERRED EMBODIMENT AND BEST MODE FOR CARRYING OUT THE INVENTION

Figure 1:
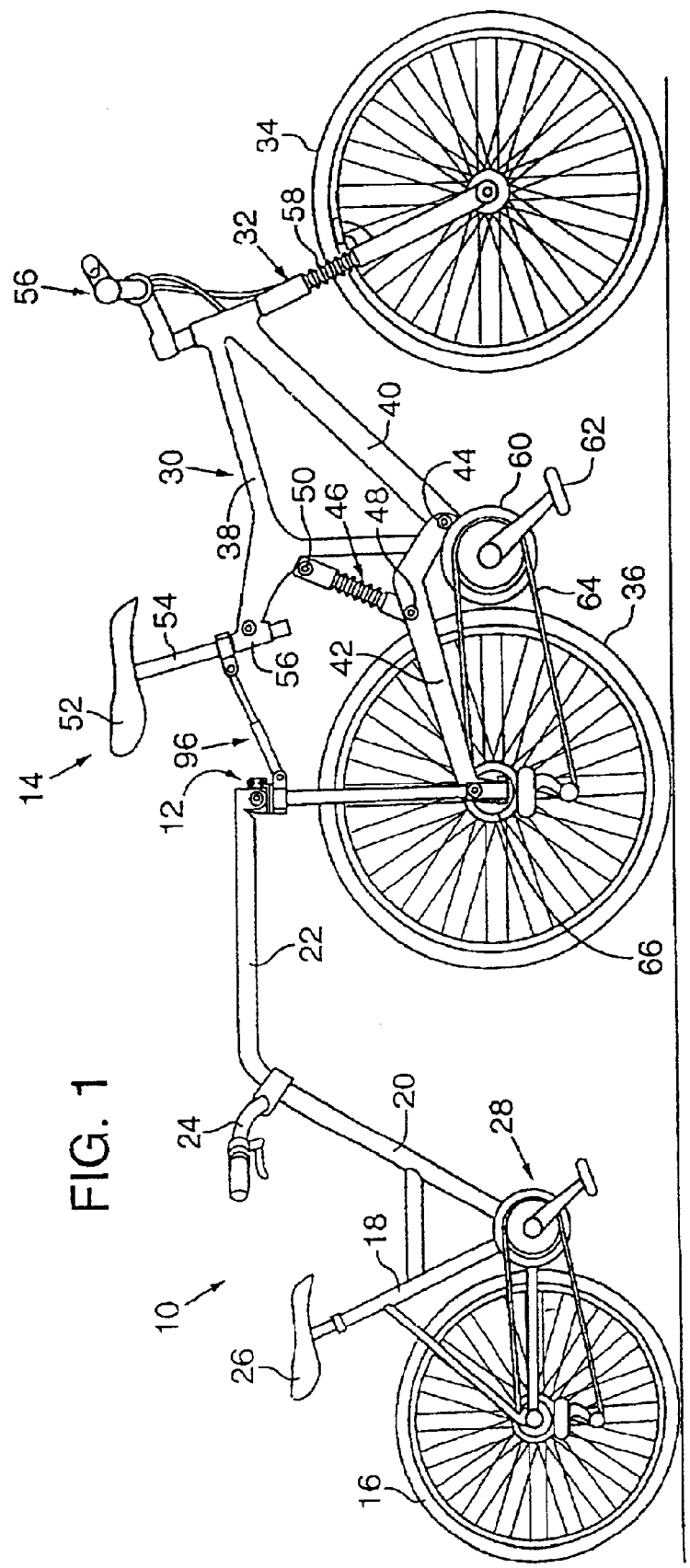
FIG. 1 is a side elevational view, of a suspension vehicle incorporating the hitch assembly of the present invention for connection to a trailer cycle.

As stated at the outset, the present invention is directed to a novel hitch assembly for mounting directly above the hub/axle of the rear wheel of a bicycle, which can be a suspension or non-suspension bicycle, for connection to the tongue of a pulled vehicle, such as a trailer cycle, child or cargo bike trailer, kayak trailer, etc. For purposes of explaining how the hitch assembly of the present invention finds particular utility for connection to a trailer cycle, FIG. 1 shows a trailer cycle, generally indicated at 10, connected by a hitch assembly of the present invention, generally indicated at 12, to a pulling or lead bicycle generally indicated at 14. Trailer cycle 10 includes a single wheel 16, mounted on a frame structure 18 which includes a diagonal tube 20 extending to a drawbar or tongue 22. Handlebars, indicated at 24, are suitably mounted on diagonal 20, and a seat 26 is mounted on a seat post extending from the frame. The trailer cycle is also provided with a pedal/sprocket/chain assembly generally indicated at 28, so that a young rider can experience how a bicycle is pedaled and shifted.

The lead bicycle shown in FIG. 1 is of the "suspension" type, which refers to its construction utilizing a shock absorber or other resilient, impact-resisting structure interposed between the frame and the rear wheel, enabling relative cushioned movement therebetween. As shown, bicycle 14 includes a frame generally indicated at 30, front forks generally indicated at 32, a front wheel 34 and a rear wheel 36. The frame includes a cross bar 38 and a diagonal tube 40, and a swing arm 42 is pivotally connected at 44 to the frame. Swing arm 42 is also connected to a shock absorber, generally indicated at 46, and the other end of the swing arm is connected to a skewer (to be described) in the axle of the rear hub. The shock absorber is pivotally connected at 48 to swing arm 42 and at 50 to the frame.

A seat is shown at 52, interconnected by means of an adjustable seat post 54 for mounting in a seat tube 56. Front handlebars are generally indicated at 56 and a front shock absorber at 58 provided on fork members 32. A pedal sprocket is shown at 60, pedals at 62 (only one shown), a drive chain at 64 and rear sprocket at 66.

Details of hitch assembly 12 shown in FIG. 1 will now be described, with reference directed initially to FIG. 2, which shows portions of the hitch assembly broken away and with parts disassembled, along with the rear wheel and its hub, with the seat of the bicycle shown in phantom lines, all for ease of understanding. As shown, hitch assembly 12 includes a cylindrical hitch unit 68 rotatably mounted on an axle-mounted support structure such as a wheelstay assembly generally indicated at 70. Hitch unit 68 is rotatable about a substantially vertical first pivot axis A and is adapted for connection to tongue 22 of the trailer cycle by means of a quick-release skewer 72. Hitch unit 68 is provided with aligned bushings 74 and 75 for receiving apertured, spaced-apart lugs 76 and 78, respectively, of tongue 22 so that skewer 72 can be extended through the respective apertures. The tongue is secured to hitch unit 68 by tightening nut 80 and clamping handle 73. When so assembled, tongue 22 can rotate or pivot about first pivot axis A and also pivot about a substantially horizontal second pivot axis, indicated at B. The trailer cycle can thereby be steered by a child to follow the path of the lead bicycle.

Hitch unit 68 is rotatably mounted on a mounting assembly or crown, shown at 82, from which downwardly extend tubular members 84 and 86 of wheelstay assembly 70 on opposite sides of wheel 36, as shown, for connection to the rear hub/axle. Sockets, shown at 88 and 90 are formed with spherical recesses (which will be shown later) for receiving specially-formed spherical ends of a locking skewer shown at 92, which extends through a conventional hub/axle assembly 94 of rear wheel 36. The wheelstay assembly is therefore pivotally connected to skewer 92 for pivotal movement about a horizontal pivot axis C.

Figure 2:
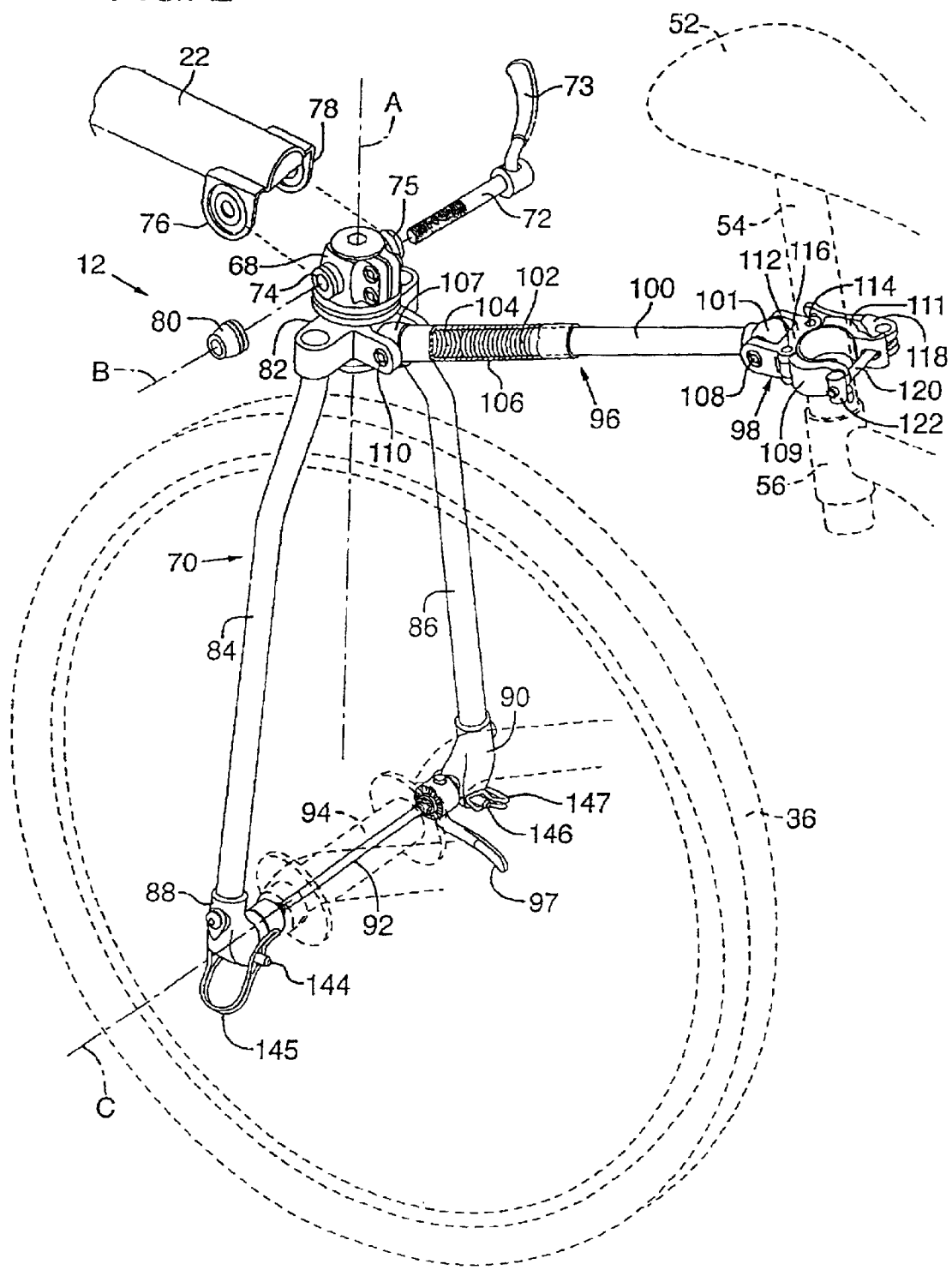
FIG. 2 is an enlarged view of the hitch assembly, shown in perspective, with portions broken away and the bicycle upon which it is mounted shown in phantom lines.

Rounding out a description of other components shown in FIG. 2, before the more detailed exploded view shown in FIG. 3 is considered, attention is directed to provision of a stabilizer, formed as a lengthwise-adjustable strut member indicated at 96. The strut member pivotally interconnects crown 82 of the hitch assembly to a detachable seat post clamp, generally indicated at 98, which in turn is secured to seat post 54. Strut member 96 includes a first tube 100 having external threads 102 which engage corresponding internal threads 104 in second tube 106, broken away to show this construction.

First tube 100 includes a first end having a bushing 101 pivotally connected by a screw 105 and insert 108 to seat post clamp 98, and second tube 106 includes a second end having a bushing 107 pivotally connected by a screw 103 and insert 110 to crown 82. The strut member fixes and maintains the orientation of wheelstay assembly 70 and hitch unit 68 substantially vertical to the ground. That ensures that first pivot axis A is substantially vertical.

The seat post clamp, generally indicated at 98, includes a pair of curved members 109 and 111 which are pivotally connected at 112, 114, respectively to a yoke 116 which mounts bushing 101 of first tube 100 to the seat post clamp. As shown in FIG. 2, seat post clamp 98 is secured to seat post 54 by clamping curved members 109 and 111 by means of a clamp handle 118 which, with its pivotal connection to bar 120, threadedly connected to a ball nut 122, forms a toggle for clamping curved members 109 and 111 to seat post 54.

An exploded view of the components shown in FIG. 2 is shown in FIG. 3. Hitch unit 68 is assembled for rotation about first pivot axis A by connection to a steerer tube 124 which includes aligned, spaced-apart apertures 124a, 124b, which align with apertures 68a, 68b of hitch unit 68 when the steerer tube is inserted upwardly through a bore 82a formed in crown 82.

Additional components of the hitch assembly include a headset cup 126 which receives upper race 128 which in turn receives headset cone 130. A cap is shown at 131. Shown below crown 82 are a headset cup 132 and a crown race 134. When assembled, steerer tube 124 is inserted through bore 82a in crown 82, as shown in FIG. 2, and screws, indicated at 136 are threaded into inserts 138 to urge tabs 140, 142 toward one another to clamp hitch unit 68 to steerer tube 124, which is rotatably held within bore 82a. To complete the mounting of tongue 22, axle bushings such as indicated at 69a, 69b are inserted in apertures 68a, 68b, respectively, tongue 22 is positioned with its apertures 76, 78 aligned with the bores in axle bushings 69a, 69b and skewer 72 is inserted through the assembly to hold the tongue in position. Adjusting nut 80 can now be tightened and handle 73 clamped to hold the assembly together enabling tongue 22 to rotate with hitch unit 68 about first pivot axis A and swing, relative to the hitch unit, about a horizontal axis, such as second pivot axis B (see FIG. 2).

The wheelstay assembly, shown at 70, includes bars 84, 86 which are mounted to sockets 88, 90, respectively. Each of the sockets is provided with an internal spherical cavity for receiving opposed, spherical ends 93a of ball nut 93 and 95a of ball nut 95, respectively. FIG. 5 shows a cross-sectional view taken through the sockets and ball nuts. Specifically, skewer 92 is configured so that spherical ends 93a and 95a are received within spherical cavities 88a, 88b, respectively. A shoulder 93b extends from ball nut 93 and shoulder 95a from ball nut 95 to provide a surface for bearing against retainers such as locking pins 144 and 146, held in place after insertion by bails 145 and 147, respectively. Spherical ends 93a, 95a provide surfaces over which their corresponding sockets, and tubular members 84 and 86 can pivot. Thus wheelstay assembly 70 is connected to skewer 92 for pivotal movement about pivot axis C.

Rounding out a description of the wheelstay assembly, it will be seen in FIG. 5 that tubular members 84 and 86 are received within apertures provided in supports 88 and 90, respectively, and are held in position by a threaded member, such as buttonhead screws 146, 148 which threadedly engage captured nuts 150, 152, respectively.

Mounting of the Hitch Assembly and Its Operation

FIG. 1 of the drawings shows trailer cycle 10 with its tongue 22 attached to hitch assembly 12 which has been previously mounted on lead bicycle 14. Because hitch assembly 12 is an attachment, or an accessory for mounting on a bicycle, an explanation of how the hitch assembly is mounted will be described. Initially, it is assumed that bicycle 14 is a suspension model such as shown, but the mounting would be essentially the same for a non-suspension vehicle. First, it is necessary to remove the extant quick-connect skewer from the rear hub of the bicycle and replace it with skewer 92 as shown in FIG. 5. With ball nut 93 detached, and clamp handle 97 moved to a neutral position, the threaded end of skewer 92 is inserted from the right (as seen in FIG. 5) so that it extends through the left end of hub assembly 94 (which is conventional) and swing arm 42, after which ball nut 93 is tightened by hand, and clamp 97 is swung to its locked position, as shown in FIG. 5, so that the skewer clamps the swing arms, such as indicated at 42, into position.

To mount the hitch assembly, an individual holds tubular members 84 and 86 and positions them to engage sockets 88 and 90 and their internal cavities 88*a*, 88*b*, respectively against spherical ends 93*a*, 95*a*, respectively. Retaining pins 144, 146 are suitably inserted, their respective bails looped into closure, as shown in FIG. 2, and the position of tubular members 84 and 86 is eyeballed and they are approximately vertically positioned, relative to the ground. Next, again by eyeball, strut 100 is rotated by hand, either clockwise or counterclockwise so that clamp 98 can be seen to be positioned for proper mounting on seat post 54. Clamp handle 118 is released, so that clamp members 109 and 111 are spread open and placed around the seat post. If the strut member needs to be adjusted further, first tube 100 is rotated correspondingly to extend or retract clamp 98 into proper position.

Clamp members 109, 111 are now swung into place, bar 120 is moved into position so that barrel nut 122 can be tightened, followed by bar 182 being moved into its clamped position, as shown in FIG. 2, to thereby orient hitch assembly 12 so that tubular members 84 and 86 are vertically positioned thereby orienting hitch unit 68 so that it will rotate about a substantially vertical pivot axis, such as first pivot axis A. Skewer 72 has been previously removed, and a trailer cycle is suitably positioned behind lead bicycle 14 so that its tongue, such as tongue 22, is moved into position over hitch unit 68, as shown in FIG. 2. The apertures and lugs 76 and 78 are aligned with the apertures in inserts 74 and 75, respectively and threaded end of skewer 72 is inserted through those aligned apertures to extend outwardly from hitch unit 68. Next, nut 80 is tightened by hand, and clamp 73 is actuated to clamp tongue 22 to bushings 74 and 75. The trailer, such as trailer cycle 10, is now free to rotate or swing about first pivot axis A relative to lead bicycle 14, and also pivot about second pivot axis B.

With hitch assembly 12 mounted on bicycle 14 and trailer cycle 10 attached to the hitch assembly, an adult can ride bicycle 14, followed by a child seated on trailer cycle 10 knowing that the child safely follows. The child, on the other hand, can pedal away and learn how to balance, experiencing to a large degree what it feels like to ride a bicycle. As the lead bicycle is leaned or steered into turns, or travels over inclines, rises, bumps or depressions, the child can feel that action as it is transmitted through tongue 22 of trailer cycle 10.

The hitch assembly of the present invention enables the trailer cycle to swing around substantially vertical first pivot axis A and pivot, up and down, about substantially horizontal second pivot axis B. Reference to these pivot axes as being substantially vertical and substantially horizontal, that is in reference to the normal orientation of bicycle 14 and trailer cycle 10 as they are being ridden. When lead bicycle 14 is leaned into a turn, and trailer cycle 10 follows, it may pivot about first pivot axis A which, in that case, may not be vertical. Obviously the same can be said with respect to second pivot axis B, which is normally horizontal when the lead bicycle and trailer cycle are ridden without leaning to one side or the other.

As mentioned previously, hitch assembly 12 finds particular application when it is mounted on a suspension bicycle, such as lead bicycle 14 shown in FIG. 4. With the hitch assembly mounted as shown, and as lead bicycle 14 travels so that its rear wheel 36 engages and rides up on a bump, such as indicated at 154, shock absorber 46 compresses and rear wheel 36 will move upwardly, relative to the frame and seat 52 of the lead bicycle. It can be seen that hitch assembly and tubular member 84 (tubular member 86 is hidden) move upwardly and just slightly off the vertical, but essentially remain vertical or perpendicular to the ground, thus ensuring that first pivot axis A is substantially vertical as wheel 36 moves upwardly relative to seat 52 because the swing arm pivots about pivot 44. The dashed outline of the wheel 36 shows its position. Strut member 96, which is pivotally connected at 108 to clamp 98, and at 110 to crown member 82, enables the wheelstays to move upwardly along with the upward movement of wheel 36, along a radius indicated at R, and also because tubular members 84 (and hidden 86) are pivotally connected to skewer 92 so that they can pivot relative to wheel 36 about pivot axis C.

The connection of strut member 96 to seat post 54 has been set at the angle shown in FIGS. 1 and 4, but it should be understood that different bicycle configurations may require that the strut member be oriented at a different angle. For example, the strut member may be set more toward the horizontal. In any case, wheelstay assembly 70 is normally positioned substantially vertical relative to the ground, and as the rear wheel moves up and down relative to the bicycle's seat, the wheelstay assembly is maintained substantially vertical.

The consequence of this action is that a lead bicycle, such as a suspension bicycle shown at 14, can encounter very rough terrain and the shock-absorbing characteristics of the lead cycle, which enable rear wheel 36 to move relative to the bicycle's frame are transferred to tongue 22 and correspondingly to trailer cycle 10. The shock absorbing characteristics of lead bicycle 14 are transferred to tongue 22 and trailer cycle 10 because of the pivotal connections of strut member 96 to crown 82, and correspondingly to hitch mount 68. As shown in FIG. 4, as bump 154 is encountered, hitch assembly 12 moves and is retained substantially above the hub/axle of rear wheel 36 because of its interconnection to seat post 54 by strut member 96 which moves along an angle indicated at $\alpha$. In an opposite rotational sense, as the wheel moves downwardly, with respect to seat 52, when a depression in the road is encountered, strut member 96 will follow along arc 156 to some bottom point measured by angle $\beta$. In that case, the wheelstay assembly, in particular tubular members 84 and 86, will pivot about axis C, some slight amount in a clockwise direction.

Overall, the handling characteristics of trailer cycle 10 are greatly improved by the non-rigidly mounted hitch assembly 12 of the present invention. In the prior art, hitch mechanisms mounted for connection to trailer tongues are rigidly mounted to a rack frame or the like connected to a lead bicycle, and any impacting or jarring action as the lead bicycle encounters bumps, depressions, etc. is immediately transferred to the tongue and the trailer cycle.

The hitch assembly of the present invention may be readily detached from a bicycle. It is only necessary to release bails 145 and 147 from their placement over locking pins 144, 146, respectively, and removal of those pins detaches sockets 88 and 90. Release of clamp are 73 of skewer 72 and loosening of nut 80 enables tongue 22 to be removed and it is only necessary now to release clamp 118, swing bar 120 out of the way and the entire hitch assembly can be removed. Mounting of the hitch assembly on the vehicle is a straightforward, relatively rapid process as described previously.

While the hitch assembly of the present invention has been shown with a trailer cycle tongue attached thereto, it should be appreciated that other types of bike trailers could be attached to the hitch assembly with beneficial results. Child and cargo trailers, kayak trailers, and others could find application by interconnecting to the hitch assembly of the present invention.

I claim:

1. For use on a bicycle having a frame, a seat mounted on a seat post, front and rear wheels and a rear hub/axle, a hitch assembly for mounting on the bicycle for connection to the tongue of a trailer, the hitch assembly comprising:

a hitch unit mounted to the bicycle above its rear wheel rotatable about a substantially vertical first pivot axis, the hitch unit adapted for connection to the trailer's tongue to enable the tongue to pivot about a substantially horizontal second pivot axis;

a support structure connected to the bicycle for mounting the hitch unit above the rear wheel so that the first pivot axis is maintained substantially vertical; and a stabilizer detachably and pivotally connected to the hitch unit and to the bicycle to permit movement of the hitch unit relative to the frame and seat of the bicycle.

2. The hitch assembly of claim 1, wherein the support structure includes a wheelstay assembly, and wherein a skewer extends through the rear hub/axle assembly of the bicycle, to which the wheelstay assembly is mounted for pivotal movement about an axis extending through the rear hub/axle assembly.

3. The hitch assembly of claim 2, wherein the stabilizer includes a strut member adapted for detachable and pivotal connection to the bicycle.

4. The hitch assembly of claim 3, wherein the strut member is pivotally connected to the wheelstay assembly.

5. The hitch assembly of claim 4, wherein the strut member is lengthwise-adjustable, so that the wheelstay assembly and hitch unit are maintained substantially vertical, relative to the ground, when the strut member is connected to the bicycle.

6. The hitch assembly of claim 5, wherein the wheelstay assembly includes a pair of elongate members, each extending from a mounting assembly positioned above the rear wheel and each including a socket at its end connected to the skewer extending through the rear hub/axle assembly.

7. The hitch assembly of claim 6, wherein the skewer extending through the rear hub/axle assembly is provided with spherical ends for reception in an associated socket.

8. The hitch assembly of claim 7, wherein the hitch unit is mounted on the wheelstay assembly above the rear wheel of the bicycle.

9. The hitch assembly of claim 5, wherein the strut member is provided with a seat post clamp at one end for detachable clamping to the bicycle's seat post, and wherein the strut member is pivotally connected to the clamp.

10. The hitch assembly of claim 9, wherein the seat post clamp is provided with a pair of curved members pivotally movable for clamping to the bicycle's seat post.

11. The hitch assembly of claim 10, wherein the wheelstay assembly includes a mounting assembly for mounting the hitch unit, the mounting assembly including a bore for receiving a steerer tube for connection to the hitch unit rotatable within the bore.

12. For use on a bicycle having a frame, a seat mounted on a seat post, front and rear wheels and a rear hub/axle, a hitch assembly for detachable mounting on the bicycle for connection to the tongue of a trailer, the hitch assembly comprising:

a wheelstay assembly detachably connected to the rear hub/axle assembly of the bicycle;

a hitch unit mounted on the wheelstay assembly above the rear wheel substantially directly above the rear hub/axle assembly, the hitch unit being rotatably journaled to the wheelstay assembly for pivoting about a substantially vertical first pivot axis aligned substantially directly above the rear hub/axle assembly and adapted for connection to the tongue of the trailer to enable pivoting of the tongue about a substantially horizontal second pivot axis; and a strut member connected to the bicycle and to the wheelstay assembly to maintain the wheelstay assembly substantially vertical during up and down movement of the rear wheel relative to the bicycle's seat.

13. The hitch assembly of claim 12, wherein the wheelstay assembly is pivotally connected to the rear hub/axle assembly of the bicycle.

14. The hitch assembly of claim 13, wherein the strut member includes a first end detachably and pivotally connected to the bicycle and a second end pivotally connected to the wheelstay assembly.

15. The hitch assembly of claim 14, wherein the first end of the strut member is connected to the bicycle's seat post, and wherein the strut member is adjustable lengthwise thereby to fix the distance between the hitch unit and the seat post.

16. The hitch assembly of claim 15, wherein the wheelstay assembly is provided with a socket at one end thereof for pivotal mounting to a skewer extending through the rear hub/axle assembly.

17. For use on a bicycle having a frame, a seat mounted on a seat post, front and rear wheels and a rear hub/axle, a hitch assembly for detachable mounting on the bicycle for connection to the tongue of a trailer, the hitch assembly comprising:

a wheelstay assembly detachably and pivotally connected to the rear hub/axle assembly of the bicycle;

a hitch unit mounted on the wheelstay assembly above the rear wheel substantially directly above the rear hub/axle assembly, the hitch unit being rotatably journaled to the wheelstay assembly for pivoting about a substantially vertical first pivot axis and adapted for connection to the tongue of the trailer to enable pivoting of the tongue about a substantially horizontal second pivot axis; and a lengthwise-adjustable strut member having a first end detachably and pivotally connected to the bicycle's seat post and a second end pivotally connected to the wheelstay assembly to maintain the wheelstay assembly substantially vertical during up and down movement of the rear wheel relative to the bicycle's seat.

* * * * *